United States Patent Office 3,518,792
Patented July 7, 1970

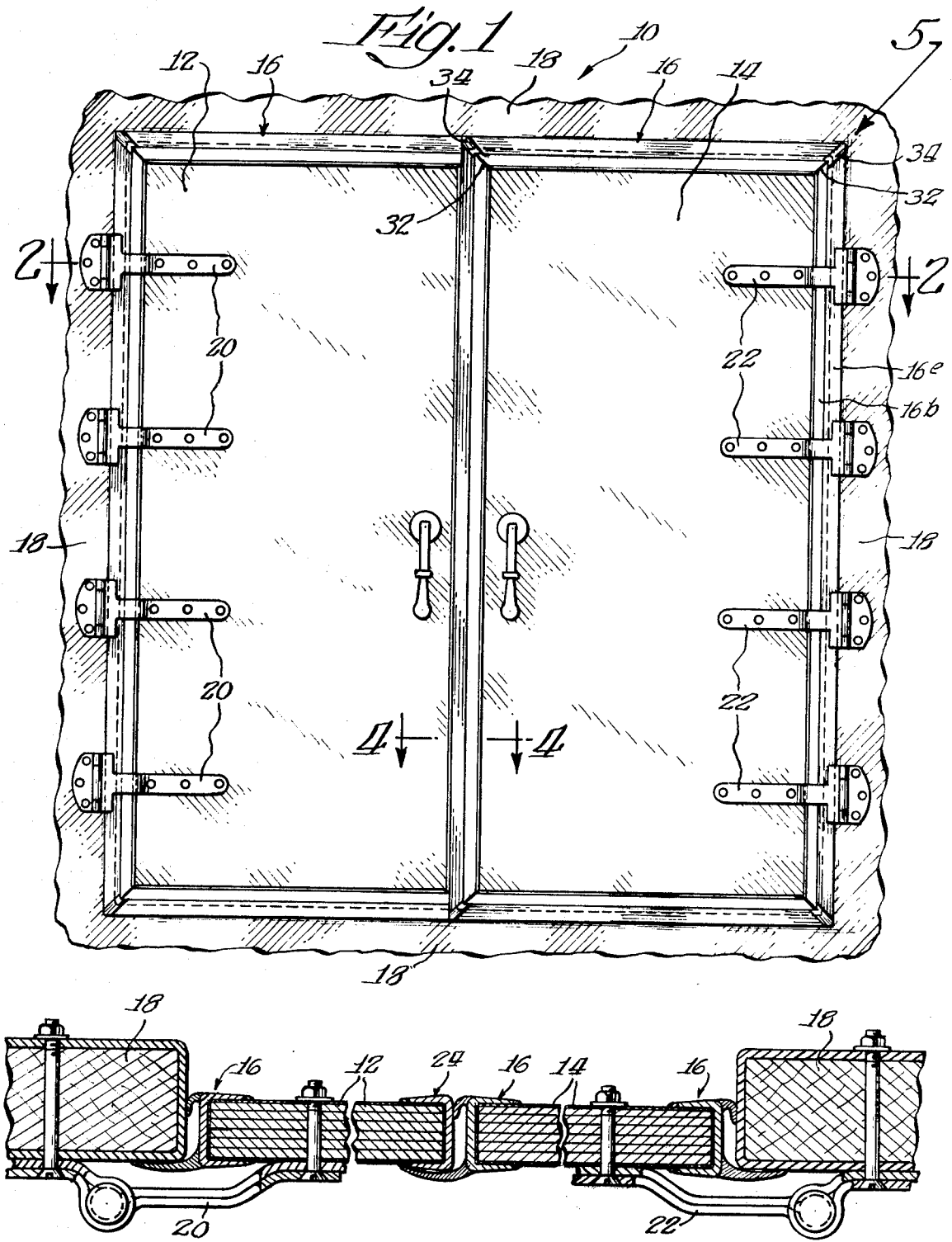

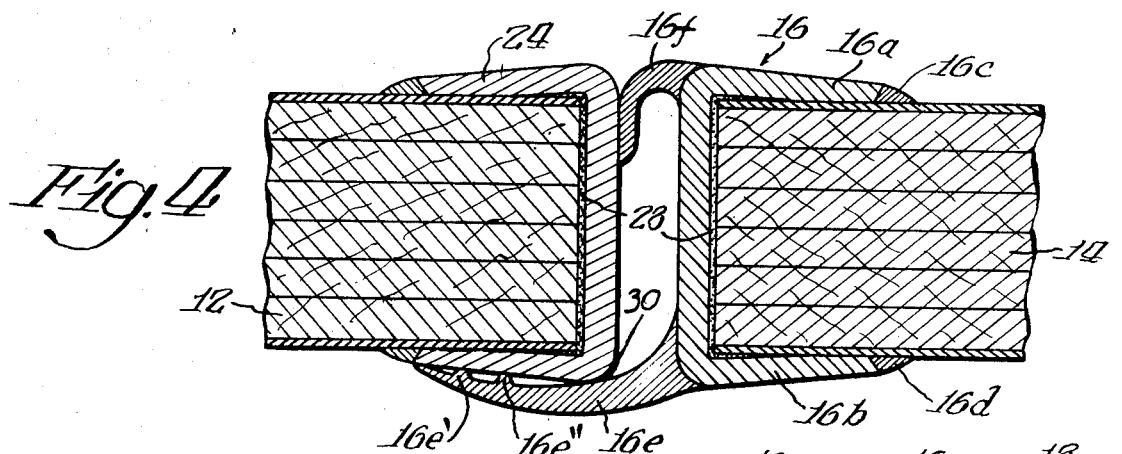
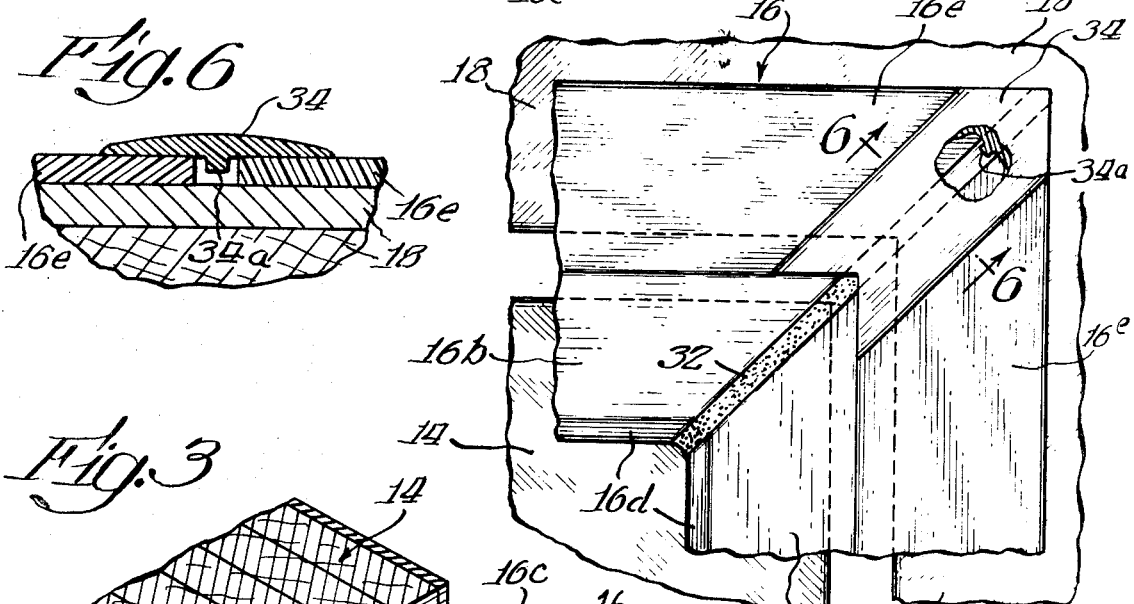
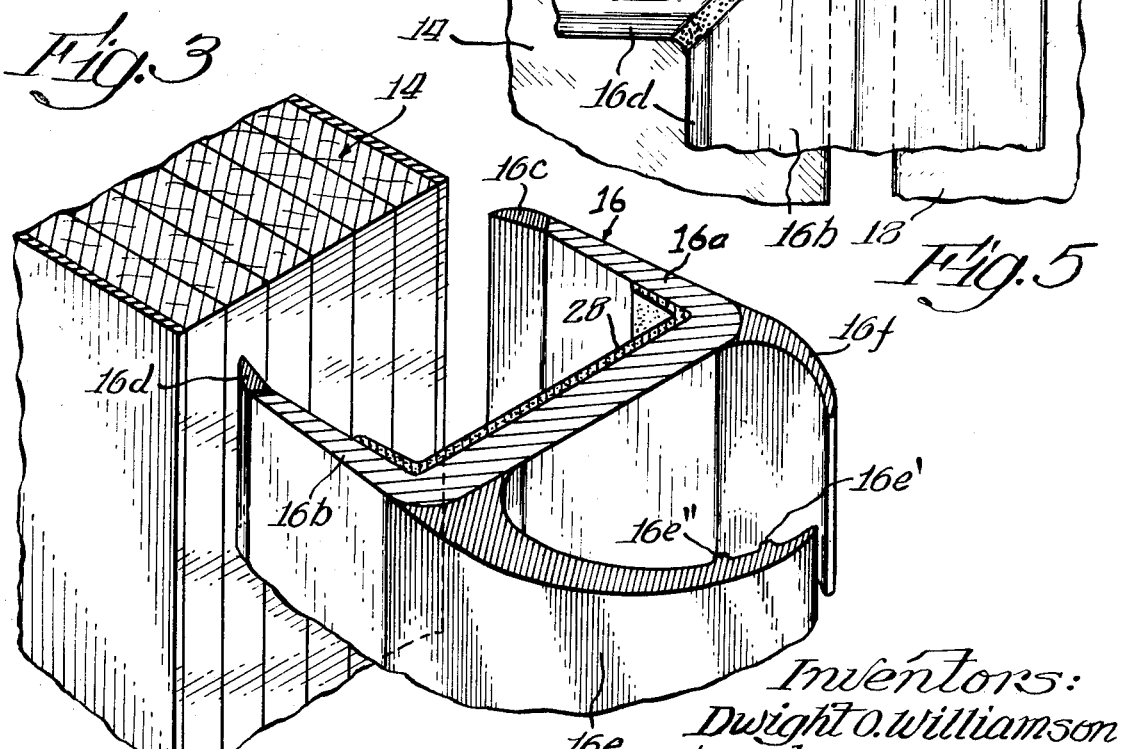

3,518,792
PANEL SEAL
Dwight O. Williamson, Chicago, and Burton A. Urbanick, La Grange, Ill., assignors to Met-L-Wood Corporation, Chicago, Ill., a corporation of Illinois
Filed May 21, 1968, Ser. No. 730,806
Int. Cl. E06b 7/22
U.S. Cl. 49—488    16 Claims

ABSTRACT OF THE DISCLOSURE

A composite, one-piece member defining an edge gasket for a container door, and the like and a dynamic closure seal with an adjacent door frame, and the like is disclosed. An elongated channel portion of the member is composed of a relatively rigid plastic and is adhesively secured to an edge portion of the door; a pair of opposed sealing lips are integrally formed with the channel portion and are directed oppositely to the channel leg portions. The sealing lips are composed of a relatively pliable plastic material and are each inwardly curved toward one another and tapered in thickness adapting them to effect a pair of independent and resilient closure seals between the door and an adjacent door frame. Other features are disclosed.

Introduction

The present invention relates generally to edge gasketing and door closure seals and to a new and improved construction for container doors, such as for use in cargo boxes, semi-trailer vans, truck bodies, railway freight cars, and the like. More particularly, the invention is directed to a one-piece edge gasket-dynamic closure seal of a composite construction, i.e., an integral structure having two or more portions of differing material composition, and to a new and improved door panel assembly having hermetically sealed edge gasketing and dynamic closure seal means.

Summary of the invention

It is a primary object of the present invention to provide a one-piece composite structure that is adapted for hermetically sealing an edge portion of a door panel or the like without use of mechanical fasteners and which is also adapted for providing a dynamic closure seal between the door panel and an adjacent member.

It is another object of the present invention to provide a unitary edge gasket-dynamic closure seal member of sufficient structural rigidity to form a secure edge frame for the door which member is also sufficiently pliable and resilient to provide an intimate closure seal with an adjacent door frame or the like.

It is yet another object to the present invention to provide a construction of the aforesaid type wherein a pair of spaced and independent dynamic closure seals are formed adjacent respectively the interior and exterior surface of the panel door.

Accordingly, the present invention is directed to a one-piece, composite member that is adapted to define an edge gasket for a container door or the like as well as a dynamic closure seal with a member adjacent to said door. Specifically, the composite member comprises an edge gasket means including an elongated channel member comprised of a relatively rigid plastic-like material and having a pair of opposed leg portions adapted for securely receiving an edge portion of the container door therebetween to define a static edge gasket for the door panel. The composite member further comprises dynamic sealing means including first and second opposed sealing lips integrally molded with the channel member. The sealing lips are directed oppositely to the channel leg portions and each is comprised of a relatively pliable plastic-like material for effecting respectively first and second independent, dynamic closure seals with an adjacent member, such as a door frame or a mating door panel.

Brief description of the drawings

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

FIG. 1 is a side elevation of a container door assembly constructed in accordance with the teachings of the present invention;

FIG. 2 is a fragmentary, cross-sectional view taken along lines 2—2 of FIG. 1;

FIG. 3 is a fragmentary, perspective view of the unitary edge gasket-closure seal of the present invention just prior to its installation on an adjacent door panel;

FIG. 4 is an exploded, sectional view taken along lines 4—4 of FIG. 1;

FIG. 5 is an exploded, detail view of the corner area denoted by the numeral 5 in FIG. 1 and illustrating the manner of hermetically sealing the mitered corner joints of the composite gasket-closure seal structure of the invention;

FIG. 6 is a cross-sectional view taken along lines 6—6 of FIG. 5.

Description of the preferred embodiments

Referring now to FIG. 1, there is illustrated a portion of a container such as the rear or side loading area of a semitrailer trunk or the like having a pair of mated swing-out doors 12 and 14. The doors 12 and 14 each include a perimeter gasketing, generally designated by the reference numeral 16 in the drawing which is constructed in accordance with the teachings of the present invention. As will be explained in greater detail later herein, the gasketing 16 is a composite structure adapted to maintain a hermetic edge seal about the periphery of each of the doors 12 and 14 and also provide a resilient dynamic closure seal between the mating edges of the two doors as well as between the doors and a rectangular door frame, denoted generally by the reference numeral 18.

The door panel means 12 and 14 may be composed of any suitable material known to the art although it is preferred from the standpoint of structural integrity and resistance to moisture, etc. that the door panels be constructed of a composite structural laminate comprising, for example, a laminated plywood panel to which there is adhesively bonded on opposed sides an outer cladding of sheet metal. At any rate, the doors 12 and 14 are appropriately mounted within the outer door frame 18 by respective groups of surface mounted leaf hinges 20 and 22. As seen in FIG. 2, the surface mounted hinges 20 and 22 are fastened respectively to the doors 12 and 14 and the vertical side-posts of the door frame 18 by bolts that extend entirely through these members. It is understood, of course, that the type of hinges and/or fasteners used constitutes no part of the present invention and other well-known mounting arrangements may be employed.

Referring now to FIG. 2, a general understanding may be had of the construction of the composite edge gasket-closure seal member 16 of the invention and their manner of cooperation with the door panels 12, 14 and the door frame 18. As will presently be considered in detail, the composite members 16 each include a base channel of a generally U-shaped cross-section that is fitted to respective edge portions of the door panels. A pair of contoured sealing lips are integrally formed with each base channel and extend oppositely to the leg portions of the channel. The sealing lips of the composite members 16 are adapted to engage a flat face portion and a transverse edge portion, respectively of an adjacent door panel or door frame post for effecting a pair of independent closure seals. In this regard, it will be noted that the vertical edge portion of the door 12 adjacent the door 14 is provided only with an edge gasket 24 to effect a proper mating with the adjacent composite member 16 of the door 14. The edge gasket 24 may be identical to the U-shaped base channel portion of the composite member 16.

The construction and operating features of the composite edge gasket-closure seal member 16 will now be considered in detail with reference to FIGS. 3 and 4. As shown in these figures, the composite member 16 includes an elongated base channel having a pair of opposed leg portions 16a and 16b that are preferably angulated slightly inwardly so as to securely receive the door panel edge portion therebetween. The channel portion of the composite member 16 is affixed to a door panel, such as the illustrated door panel 14, solely by use of an adhesive mastic 28 in combination with the natural gripping and sealing action of the channel leg portions 16a and 16b.

Although a uniform layer of mastic 28 is shown in FIG. 3 as having been applied to the interior surface of the base channel it will be understood by those skilled in the art that the mastic may be applied as a series of vertically aligned parallel beads that spread to form a relatively uniform layer of mastic as the base channel is force fitted onto the edge portion of the door panel 14. Of course, as a further alternative it is understood that the mastic may initially be applied to the door panel 14, if desired.

In order to provide a requisite structural integrity to the edge frame of the door panel, the base channel of the composite member 16 is comprised of a relatively rigid plastic-like material. Specifically, it is presently preferred that the base channel be composed of a comparatively rigid polyvinyl chloride of approximately a 78 Shore D durometer. However, to assist in assuring a reliable hermetic seal between the door panel and the base channel portion of the member 16, the tip portions 16c and 16d, respectively, of the channel legs 16a and 16b are formed of a relatively pliable plastic material and are contoured so as to normally project inwardly toward one another thereby to provide an intimate, resilient engagement with the opposed sidewalls of the door panel 14. Preferably, the tip portions are composed of a flexible polyvinyl chloride on the order of a 68 Shore A durometer.

The composite structure 16 also comprises an integral dynamic sealing means having first and second opposed sealing lips 16e and 16f, respectively, integrally molded to the channel portion and directed oppositely to the channel legs 16a and 16b. The sealing lips 16e and 16f are likewise composed of a relatively pliable plastic-like material which conveniently may be identical to the material forming leg tip portions 16c and 16d. It is understood, however, that in certain applications it may be desirable to employ a material for the sealing lips that is of a different composition and/or durometer than that used for the leg tip portions 16c and 16d.

At any rate, both of the sealing lips 16e and 16f are comparatively thick at their respective points of attachment to the channel member but taper in thickness towards their tip portions to provide a progressively increasing flexibility. The sealing lips 16e and 16f are also formed so as to naturally curve inwardly toward one another. This inwardly curved configuration assures a resilient and reliable dynamic closure seal that is maintained despite moderate shifting and displacement of the doors or changes in their dimensions due to variations in temperature, etc.; the configuration and mode of operation of the sealing lips also assures a total reliability in sealing despite repeated openings and closings of the container doors over a long period of time. Reliability of sealing is also enhanced by virtue of the fact that the lips 16e and 16f define two independent, spaced closure seals at approximately the interior and exterior surfaces of the door panel. Along these same lines, it is to be noted, that the sealing lip 16e includes on its interior surface a pair of vertically directed contact ridges 16e' and 16e" that are spaced sufficiently from one another and from the extreme tip portion of the lip 16e so as to provide three distinct contact points, as will presently be explained.

The manner in which the opposed sealing lips 16e and 16f effect a dynamic closure seal with an adjacent member such as the vertical door frame pillar 18 is best understood by specific reference to FIG. 4. As shown in this drawing, the doors 12 and 14 are in a properly closed position and their adjacent edge portions are joined in a hermetically sealed relationship by the co-operative action of the composite member 16 and the edge gasket 24. More specifically, the interior sealing lip 16f is biased even further inwardly from its normally curved contour due to the relatively close proximity of the edge gasket 24 thereby effecting a resilient and intimate engagement with the member 24 to effect a dynamic closure seal near the interior surface of the door.

On the other hand, closure of the door 14 causes the outer sealing lip 16e to resiliently engage the outer surface or face of the door 12. In completing proper closure of the door, the sealing lip 16e is biased outwardly from its normally curved contour to approach an almost linear condition. The lip 16e, of course, resiliently resists outward deflection and such action results in an intimate and secure engagement at a multiplicity of points between the door 12 and the lip 16e, namely at the extreme tip portion of the lip 16e and at the contact ridges 16e' and 16e" as well as at a tangential contact point 30 near the base of the lip 16e. In summary, the lips 16e and 16f are of a resilience to accommodate door movement due to loading or other dynamic forces without breaching the respective closure seals.

In those instances where the composite structure 16 is utilized as perimeter gasketing for a rectangular container door or the like, it is necessary to hermetically seal the mitered joints formed at the intersection of horizontal and vertical extending segments of the composite member. To this end and as illustrated in FIGS. 5 and 6, a mitered expansion joint is provided at each corner by insertion of an adhesive sealant filler 32 between the adjacent tip portions 16d and the adjacent rigid channel leg portions 16b of the composite members 16. On the other hand, the adjacent surfaces of the pliable portions 16e of the composite members 16 are joined by a cover tab 34 that is positioned in overlapping relation to the pliable lip portions 16e. A depending index ridge 34a of the tab 34 locates in the separation slot between the lips 16e to center the cover tab. The cover tab 34 is of a like material to that of the lips 16e and is fused to the lip portions 16e to form a continuously sealed surface.

We claim:
1. A one-piece, composite member adapted to define an edge gasket for a container door or the like as well as a dynamic closure seal with a member adjacent to said door, said composite member comprising:
  edge gasket means including an elongated channel member, having a pair of opposed leg portions, comprised of a relatively rigid plastic-like material and adapted for securely receiving an edge portion of said container door intermediate said opposed leg portions, said opposed leg portions of said channel member each including an inwardly curved tip portion comprised of a relatively pliable plastic-like material adapted to intimately engage opposed face portions of said container door or the like for assuring a static seal therebetween;
  dynamic sealing means including first and second opposed sealing lips integrally formed with said channel member and directed oppositely to said channel leg portions, said sealing lips each being comprised of a relatively pliable plastic-like material for effecting respectively first and second independent, dynamic closure seals with said adjacent member.

2. The invention of claim 1 in which said first and second opposed sealing lips are normally curved inwardly toward one another.

3. The invention of claim 2 in which said first sealing lip is of a predetermined longer length than said second sealing lip.

4. The invention of claim 3 in which each of said sealing lips is tapered in thickness.

5. The invention of claim 4 in which said first and second sealing lips are respectively biased outwardly and biased further inwardly upon closure of said container door or the like for effecting a pair of independent and resilient dynamic closure seals between said container door or the like and said adjacent member.

6. The invention of claim 5 in which said sealing lips and said tip portions of said channel leg portions are comprised of a substantially identical, pliable plastic-like material.

7. The invention of claim 6 in which said first sealing lip includes a pair of spaced, parallel sealing ridges on its inwardly facing surface portion, said ridges being oriented approximately parallel to the direction of elongaation of said channel member.

8. The invention of claim 7 in which said channel member is composed of a comparatively rigid polyvinyl chloride of approximately a 78 Shore D durometer and said sealing lips and said leg tip portions are composed of a relatively flexible polyvinyl chloride of approximately a 68 Shore A durometer.

9. The invention of claim 8 in which said edge gasket means further includes an adhesive mastic and in which said gasket means is adapted to hermetically seal said edge portion of said container door or the like solely by the gripping action of said elongated channel member and said adhesive mastic.

10. A hermetically sealed container door or the like adapted for effecting a dynamic closure seal with an adjacent member, comprising:
  door panel means having a peripheral edge portion;
  gasket means for said door panel means including an elongated channel member of generally U-shaped cross-section, said channel member being comprised of a relatively rigid plastic-like material and having a pair of opposed leg portions for receiving a predetermined segment of said peripheral edge portion of said door means in secured relation between said leg portions, said channel leg portions each including inwardly curved tip portions comprised of a relatively pliable plastic-like material for resiliently engaging opposed surfaces of said door panel means;
  dynamic sealing means including first and second opposed sealing lips integrally formed with said channel member and directed oppositely to said channel leg portions, said sealing lips each being comprised of a relatively pliable, plastic-like material for effecting respectively first and second independent, dynamic closure seals with said adjacent member and an adhesive mastic interposed between said channel member and said door panel means, said adhesive mastic and the gripping action of said channel leg portions constituting the sole means for effecting a secure engagement and hermetic seal between said gasket means and said door panel means.

11. The invention of claim 10 in which said first and second opposed sealing lips are curved inwardly toward one another.

12. The invention of claim 11 in which said first sealing lip is of a predetermined longer length than said second sealing lip.

13. The invention of claim 12 in which each of said sealing lips are tapered in thickness.

14. The invention of claim 13 in which said peripheral edge portion of said door panel means includes intersecting edge segments each being fitted with respective segments of said composite member and in which a mitered joint is formed between adjacent pairs of the relatively rigid leg segments of said composite members by a resilient adhesive filler and between adjacent pairs of the relatively pliable sealing lips by corner cover tabs each having a depending indexing rib located between an associated pair of relatively pliable lip segments for orienting the cover tab parallel to the axis of said miter joint, said cover tab being fused to said pair of relatively pliable lip segments to form a continuous, sealed surface.

15. In composite door panel gasketing of the type having relatively rigid channel portions adapted for fitting along the peripheral ends of a door panel and relatively flexible contoured sealing lips adapted for engaging a frame of said door panel in forming a hermetic seal therebetween, means providing a hermetically sealed mitered joint between intersecting segments of said composite door panel gasketing comprising:
  corner cover tab means composed of a flexible material similar to that of said contoured sealing lips and adapted to be joined in overlapping relation over at least the intersecting sealing lip portions of said gasket segments for providing a continuous, sealed surface at the mitered joint of said intersecting gasket segments, said corner cover tab being contoured to conform to the contours of said intersecting sealing lips and being relatively thin in comparison to the maximum thickness of said sealing lips so as not to materially reduce the flexibility of said sealing lips at said mitered joint; and
  resilient adhesive filler means interposed between the intersecting segments of said gasket channel portions for providing a hermetic seal between said intersecting channel portions.

16. The means of claim 15 in which said cover tab includes a depending index ridge adapted to locate in the separation slot formed intermediate said intersecting segments of said gasket channel portions for centering said cover tab relative to said intersecting segments of said gasket channel portions.

References Cited

UNITED STATES PATENTS

| 2,122,608 | 7/1938 | Harlow | 49—495 X |
| 2,278,756 | 4/1942 | Wright | 49—479 X |
| 2,364,962 | 12/1944 | Eagles | 49—479 X |
| 2,855,639 | 10/1958 | Korb | 49—479 X |
| 2,913,777 | 11/1959 | Viets | 49—505 |
| 3,204,299 | 9/1965 | Black | 49—495 X |
| 3,341,975 | 9/1967 | Tylisz | 49—488 X |
| 3,378,958 | 4/1968 | Parks et al. | 49—495 X |
| 3,385,001 | 5/1968 | Bordner | 49—490 X |

DAVID J. WILLIAMOWSKI, Primary Examiner

P. C. KANNAN, Assistant Examiner

U.S. Cl. X.R.

49—490, 495